Aug. 8, 1933.   J. W. ALLEN   1,921,719
ELECTRICAL APPARATUS
Filed Jan. 28, 1932   2 Sheets-Sheet 1
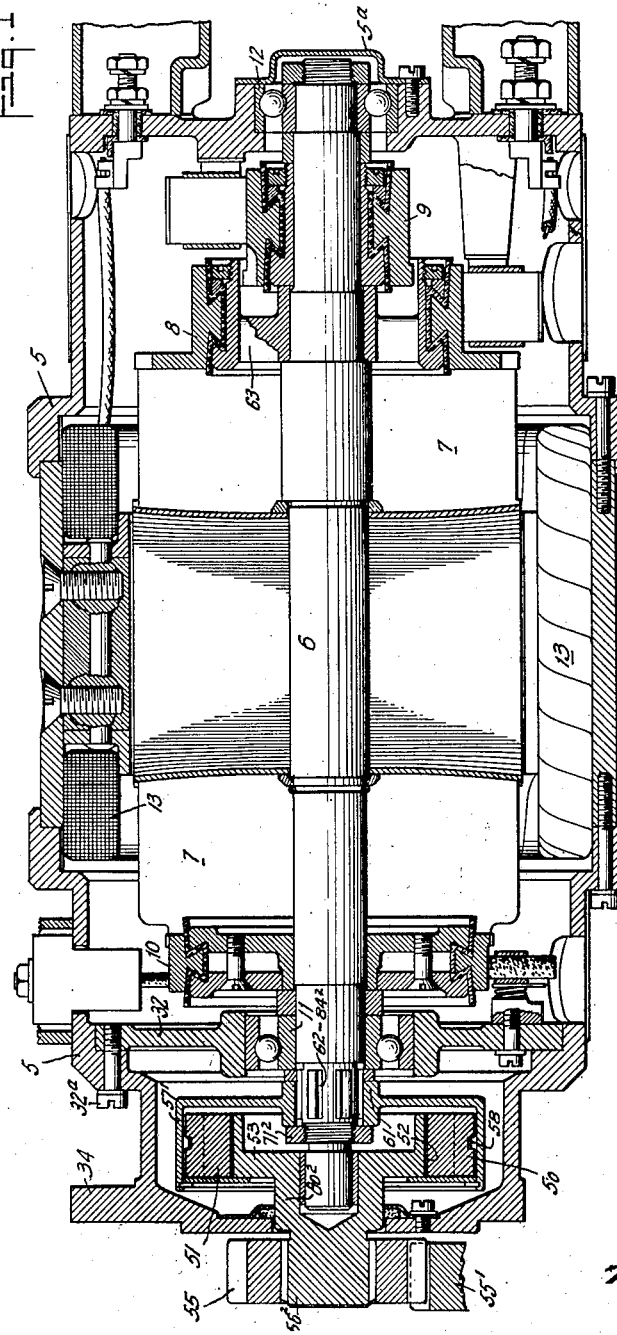
INVENTOR.
Joseph W. Allen
BY
Martin J. Finnegan
ATTORNEY.

INVENTOR.
Joseph W. Allen

Patented Aug. 8, 1933

1,921,719

UNITED STATES PATENT OFFICE 1,921,719

ELECTRICAL APPARATUS

Joseph W. Allen, East Orange, N. J., assignor, by mesne assignments, to Eclipse Aviation Corporation, East Orange, N. J., a Corporation of New Jersey Application January 28, 1932. Serial No. 589,516

6 Claims. (Cl. 290—50)

This invention relates to electrical apparatus and more particularly to an electrical generating apparatus and its associated distributing system.

An object of the invention is to provide an electric generator of the type employing a plurality of rotor windings adapted to cooperate with a common field for the purpose of supplying electrical energy at different voltages to an associated load, such for example as the high and low voltage elements of a radio transmitter.

Generators of this character have been used heretofore on vehicles equipped with radio transmitting apparatus, particularly aircraft; and when so employed, in addition to the mechanical driving means, such generators have in certain instances been equipped with electrical connections to a battery or equivalent source of electrical energy whereby the generator may be operated as a motor-generator or dynamotor so as to continue supplying current to a radio transmitter or other load, notwithstanding a de-energization or disabling of the aircraft engine. When so operated the device has been provided with overrunning clutch mechanism, permitting relative rotation between the armature shaft and the engine driven member when the engine is at rest, while at the same time affording a positive drive while the engine is running. When such an overrunning clutch constitutes the sole driving connection between the engine and the generator, the latter is subjected to the shocks and speed fluctuations characteristic of an internal combustion engine, which shocks and fluctuations are obviously objectionable, particularly when the load being supplied by the generator is one which requires the maintenance of constant voltage output from the generator.

Accordingly one of the objects of the present invention is to provide improved operating connections between an engine and an electrical unit driven thereby, said novel connections embodying features, the use of which serve to eliminate the disadvantages above referred to. By way of illustration of this phase of the invention, three embodiments are herein shown, one of which involve the use of a combined flexible coupling, speed responsive clutch and one-way clutch in a single unit adapted to produce both overrunning and yielding actions, the second involving flexible and overrunning features, while the third involves the use of a single speed responsive unit (not claimed per se) also capable of yielding action and adapted to drive in one direction only.

Another object of the invention is to provide a novel method and means for electrically inter-relating the different rotor windings above referred to in order to produce an electrical unit capable of operation either as a multi-voltage generator with certain of the voltage windings placed in series, or as a dynamotor or motor generator with said windings placed in multiple relationship. By the use of such novel method and means, the variations in voltage resulting from transfer from a mechanical drive to an electrical drive may be compensated for by operation of conveniently located circuit controlling apparatus, and without the necessity of any structural or mechanical adjustment of the dynamo electric machine itself.

A further object of the invention is to provide a multi-voltage dynamo electric machine of the foregoing character which is compact and light, and which is capable of long sustained operation with a high degree of efficiency for any of the purposes for which it is well adapted, particularly for use on aircraft to supply electrical energy to a radio transmitter both during flight and during periods of inaction.

These and other objects and advantages to be derived from the use of the invention disclosed herein will become evident on a consideration of the following description when read with reference to the accompanying drawings illustrating three embodiments of the invention. It is to be expressly understood, however, that said drawings are for the purpose of illustration only, and are not to be construed as a definition of the limits of the invention, reference being had for this purpose to be appended claims. Reference is also to be had to my copending application Serial No. 653,747, filed January 26, 1933 for claims to the driving connections, per se, of Figs. 3 to 6 inclusive.

In the drawings,

Fig. 1 is an axial section of a device embodying the invention;

Fig. 2 is a diagrammatic view of the circuit connections involved;

Figure 7:
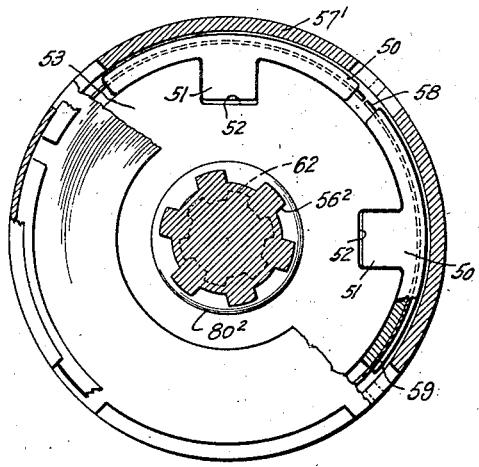
Fig. 7 is a sectional view of the coupling shown in Fig. 1, the view being taken along the line 7—7 of Fig. 8.

Referring more particularly to Figs. 1 and 2, there is shown a generator 5 of the direct current shunt wound type, having an armature shaft 6 and an armature drum 7 which latter is adapted to carry three separate windings. These windings are preferably so arranged and designed that one of them constitutes a high voltage generating winding while the other two are alternately employed as low voltage generating and motor windings for the purposes which are suggested above, and which will appear more fully hereinafter.

Each of these windings is connected to a commutator, the two low voltage generating windings being connected to commutators 8 and 9, respectively, while the high voltage winding is connected to a commutator 10. A shunt field winding 13 is common to the armature windings and is adapted to furnish the proper field excitation. The high voltage commutator 10 is adapted to be connected through leads 14 and 15 to a substantially constant load such as, for example, the anodes or plates 16 of a plurality of thermionic tubes of a radio transmitting set, two of which are shown diagrammatically in Fig. 2. The low voltage commutators 8 and 9 are adapted to furnish energy in series to a substantially constant load such as the cathodes 25 of the thermionic tubes of the transmitting set. A battery 26, constituting a variable load, is connected in parallel with the load 25 and is adapted to be charged by said low voltage windings during normal operation of the generator.

In order that the electrical output from both the high and low voltage commutators may be controlled within narrow limits, a voltage regulator 27 of the vibrating contact type may be connected in series with the field winding 13.

Preferably this voltage regulator is of the type disclosed in copending application Serial No. 261,349 of Raymond P. Lansing as is also the automatic relay cut-out 28.

The armature shaft 6 may be rotatably mounted as by means of ball bearings 11 and 12, the former in a plate 32 which may be attached to the mounting-bracket end 34 of the housing 5 by means of a plurality of screws 32a while the latter bearing is held in the opposite end of housing 5 by a retainer plate 5a as shown.

In aircraft installations, the radio generators heretofore employed have been positively connected through suitable driving connections with a rotating portion of the internal combustion engine, a one-way clutch being interposed in the driving connection between the armature of the generator and the internal combustion engine, so that when the latter is not in use the generator may be operated as a motor generator, or dynamotor, from a battery previously charged by the generator. In accordance with this invention, instead of being connected to merely one of the commutator windings during operation as a motor-generator, the battery is connected to a plurality of low voltage windings in multiple, thus insuring the delivery to the machine of an electromotive force which will at all times be sufficient to compensate for all voltage losses in the connectors, leads, and brush windings; which losses, in machines of this character heretofore employed, have militated against the maintenance of the same high voltage output while operating as a motor-generator as that which is attainable through mechanical drive from the engine.

In order to make it possible to employ the low voltage windings to the best advantage under each condition, and thus achieve the constant output above referred to, the invention provides a novel switching mechanism whereby the said windings may be connected in series during mechanical driving of the machine, and in parallel during electrical driving thereof. As shown schematically in Fig. 2, such switching mechanism includes a multi-bladed switch member 30 having a contact 31 adapted to be bridged while the machine is operating as a generator, and a set of contacts 33 bridged while the machine is operating as a dynamotor, energized from the battery. With the switch in the former position, it is evident that the low voltage windings 8 and 9 are connected in series with the battery 26, and also with the "filament" or cathode elements of the radio transmitting set, the circuit being traceable from the positive side of the winding 8 by way of wires 17 and 18, the internal connections (not shown) of units 27 and 28, wires 19, 20, 23, 24, 15, 35, 36, 37, 38 and 39, winding 9, wire 40, blade 46, contact 31 and wires 42 and 43. At the same time the battery 26 is charged by reason of its being connected across the line, and the radio set is also supplied by the high voltage windings 10, the circuit passing by way of conductors 14 and 15.

Now when it is desired to operate the machine as a motor generator (as, for example, in the event of a forced landing and in absence of fuel or other disability of the main power plant of the craft) the switch 30 is thrown to the reverse position, whereupon the windings 8 and 9 will be connected in parallel; (the circuit to the former passing through blade 47, and the other through blades 45 and 46) to receive energy from the battery 26, the high voltage winding 10 continuing to function to supply the plate circuit of the radio set. By virtue of the parallel relation of the windings 8 and 9, now obtaining, the voltages impressed thereon must be maintained substantially equal, and in each winding such voltage must be approximately one-half the voltage developed by the windings when cooperating in series, in order to provide substantially constant voltage across winding 10 under both conditions. This may be more readily apparent from the following analysis:

Let it be assumed that:

$E^g$ represents voltage developed in each low voltage winding as a generator; (windings in series)

$E^d$ represents voltage available at each low voltage winding as a dynamotor; (windings in parallel)

$E^b$ represents voltage drop in brushes;

$E^a$ represents voltage drop in each low voltage armature;

$V^g$ represents voltage at generator terminals when charging the battery;

$V^b$ represents voltage of battery when discharging, that is, when supplying current to the dynamotor;

$E^r$ represents voltage drop through the variable resistance 21 in the dynamotor or generator line.

Expressed in terms of these symbols:

$$E^g + E^g - 2E^b - 2E^a - E^r = V^g \quad (1)$$

and $$E^d + E^g + E^a + E^r = V^d \quad (2)$$

Now it is well known that in practice there is always a difference between the voltage at the generator terminals and the voltage across the battery terminals. Using the symbol C to represent this difference it follows that the relation of the generator voltage to the battery voltage may be expressed as follows:

$$V^g = V^d + C \quad (3)$$

Substituting for $V^g$ its equivalent as shown by Equation (1) and for $V^d$ its equivalent as shown by Equation (2), Equation (3) becomes:

$$2E^g - 2E^b - 2E^a - E^r = E^d + E^b + E^a + E^r + C \quad (4)$$

This may be simplified to read:

$$2E^g - 3E^b - 3E^a - 2E^r - E^d = C \quad (5)$$

Now in order to provide approximately the same high voltage across the winding 10 whether the machine is operating as a generator or dynamotor, $E^g$ and $E^d$ must be maintained substantially equal, as above explained. Therefore $E^g$ may be substituted for $E^d$ in Equation (5), whereupon said equation becomes:

$$E^g = 3(E^b + E^a) + 2E^r + C \quad (6)$$

Or $E^d$ may be substituted for $E^g$ causing the equation to read:

$$E^d = 3(E^b + E^a) + 2E^r + C \quad (7)$$

It is to be understood that $E^r$ is adjustable at the will of the operator in order to compensate for any change in quantity C in order to maintain $E^g$ (or $E^d$, as the case may be) at a constant value as C varies. C will be a minimum where charging voltage is set low and battery voltage is high, as in a fully charged battery, while with a high charging voltage and a nearly discharged battery C will be maximum.

$E^a$ is a relatively fixed quantity; but $E^b$ can be chosen to give approximate or rough corrections for a range of value C while the value $E^r$ at the control of the operator may be used to provide closer corrections as C changes during operation, as will occur progressively as the battery becomes discharged.

Figure 3:
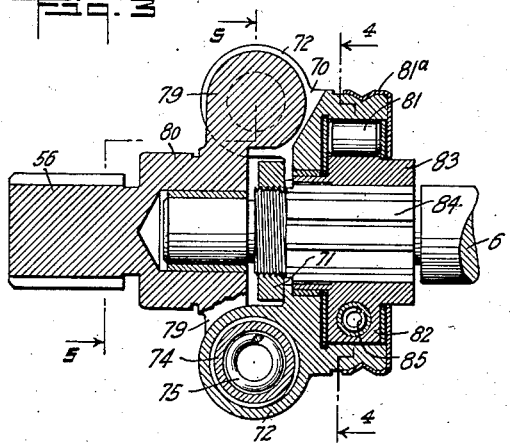
Fig. 3 is a view in longitudinal section of a novel coupling applicable to drive the machine shown in Fig. 1.
Figure 4:
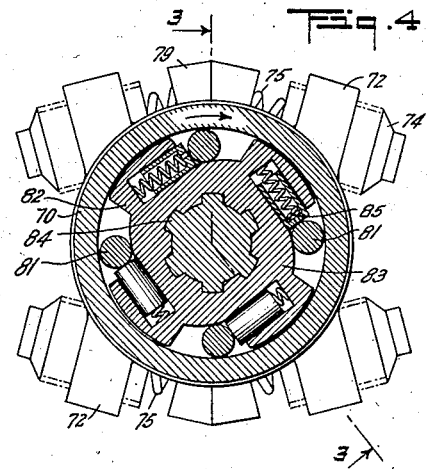
Fig. 4 is a transverse sectional view along the line 4—4 of Fig. 3.
Figure 5:
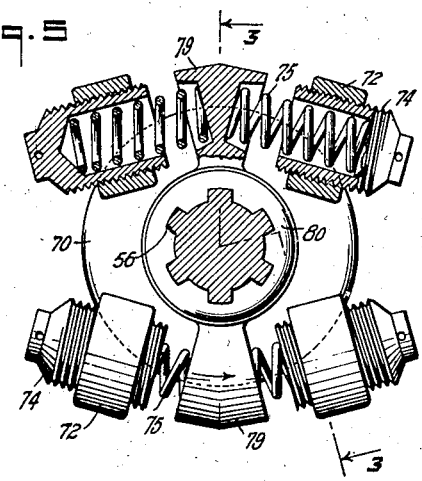
Fig. 5 is a transverse section taken along the line 5—5 of Fig. 3.

As above suggested, in place of the non-yielding one-way driving connection heretofore employed, the present invention includes novel coupling means embodied in a single unit having the functions of a yieldable torque limiting coupling and an overrunning clutch. In Figs. 3, 4, and 5, this feature of the invention is shown constituted by a device having a central hub portion 70 that is mounted on the armature shaft and is adapted to rotate therewith, being suitably locked thereon as by means of a threaded nut 71. In the form shown, the hub 70 has eyes 72 which extend substantially at right angles to the plane of the central portion 70, the inner walls of the openings in each eye being threaded to receive exteriorly threaded cup-shaped members or holders 74. Preferably the outer end of each holder is slotted to receive a suitable adjusting tool.

Extending into each of the cups is one end of a compression coil spring 75 of any suitable type. The opposite ends of springs 75 engage opposite faces of an intermediate coupling member 79 which is integral with the bored coupling member 80, the latter having a splined portion 56 adapted to receive an engine driven gear 55. As shown in Fig. 5, the faces of the coupling member 79 are cut at an angle to the center line thereof so as to be normal to the axes of the springs engaging therewith, the latter being disposed along lines approximately tangential to the central hub portion 70.

The overrunning portion of the coupling includes a plurality of rollers 81 adapted to be held by a resilient cap 81a in a corresponding number of radially extending portions 82 formed at regularly spaced intervals about the periphery of an inner race 83 splined to the armature shaft as indicated at 84. As shown best in Fig. 4, these rollers are normally maintained in engagement with the inner surface of the hub 70 by resilient means such as spring 85 so that, as member 70 rotates in a clockwise direction, rollers 81 will be effective to rotate the driven member 83. However, if it is attempted to transmit torque from member 83 to member 70 in the same direction of rotation, the rollers 81 will become ineffective.

From the foregoing it is apparent that as driving torque is transmitted from the engine to the coupling member 80, the latter acts yieldingly through the connection 75 to transmit the driving force to the armature shaft 6, and at the same time to cushion the shocks due to changes in the engine speed. The compression of spring 75 is positively limited by the engagement of the adjacent ends of holders 74 and 79, and by suitably adjusting said holders the load deflection characteristics of the connection may be varied within wide limits. Moreover the inertia of the armature is yieldably overcome by the flexible coupling without sudden jars or shocks.

The construction is particularly adapted for use in connection with airplane engines wherein no flywheel is provided, and wherein the engine vibration and sudden starting and stopping of the engine is likely to seriously damage or disrupt the driving connection between the generator and the engine, if said connection is non-yielding.

Figure 6:
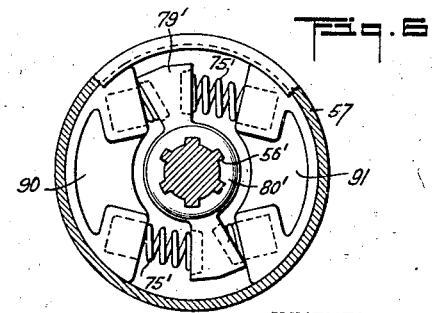
Fig. 6 is a sectional view of a second novel coupling.

Fig. 6 shows a second form of driving connection which may be employed, this form embodying the flexible and overrunning features of the coupling shown in Figs. 3, 4 and 5, but adding thereto a centrifugal factor, obtained by substituting for the holders 74 of Figs. 3, 4 and 5, a pair of friction shoes 90 and 91 adapted to be maintained in firm frictional contact with the inner surface of a drum 57 by the action of springs $75^1$, one pair of which are adapted to absorb shocks transmitted in one direction by yielding in the manner indicated in Fig. 6, and the other being adapted to absorb shocks transmitted in the opposite direction. It will be noted however, that all four springs, as well as centrifugal force, act to maintain the shoes in frictional contact, and the torque transmitting capacity of the clutch will accordingly depend in part upon the size and setting of the said springs. Preferably the central driving member $79^1$ is driven from the engine or other mechanical driving means while the drum 57 constitutes the outer race of an overrunning clutch assembly preferably taking the form of that shown in Figs. 3 and 4, the provision of such an overrunning clutch mechanism being operative to prevent any frictional wear between the shoes 90 and 91 on the one hand, and the drum 57 on the other, during the time the electrical unit is being operated from the battery as a motor generator.

Figure 8:
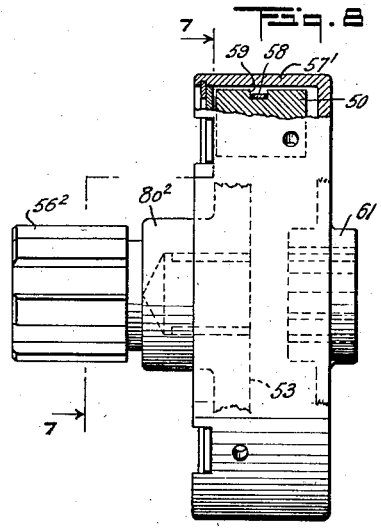
Fig. 8 is a view in elevation with parts broken away and sectioned, of the last named coupling.

In the embodiment shown in Figs. 7 and 8 (which is not claimed per se) the coupling includes a plurality of arcuate friction shoes 50 having inwardly projecting lugs 51 engaging recesses 52 provided at equal angular intervals about the periphery of a plate 53, which, as shown, is preferably integral with coupling member 80², and splined member 56², the latter carrying a pinion 55 adapted to mesh with and be driven by an engine driven gear 55¹. The friction shoes 51 are normally held out of contact with the inner periphery of a drum 57¹ by suitable means taking the form, as shown, of a split metallic ring 58 extending along the centrally disposed grooves 59 in the convex surface of the shoes, the grooves 59 being of suitable depth to avoid interference with the outward movement of the shoes in response to centrifugal force created therein as the plate 53 is driven through the connections above referred to. The drum 57¹ has integrally formed thereon a hub 61 the interior surface of which is splined for connection with the splined portion 62 of the armature shaft 6, and retained thereon by means of nut 71² screw threaded to said shaft.

With this construction, it is apparent that as the engine approaches its normal speed the centrifugal force acting upon the shoes 51 will cause them to overcome the restraining force of the spring 58 and establish firm contact with the inner surface of the drum 57¹, while at the same time permitting a slipping of the shoes along said surface in the event of excessive shocks being imparted to said shoes through the engine driven connections. As soon as the shoes have absorbed the shock thus imparted, the shoes again resume positive frictional association with the drum and thus maintain the latter at a constant speed of rotation without presenting thereto the excessive shocks and vibrations of the engine. When the engine driven plate 53 falls below the predetermined speed at which the friction shoes overcome the spring 58, the latter is effective to break the driving relationship and thus prevent a return torque transmission to the engine driven members from the generator when the latter is operated as a dynamotor.

In placing the commutators 8 and 9 at one end of the armature drum, means are provided whereby one low voltage winding may be led through the other in order to permit the proper electrical connections to be made. Preferably such means is constituted by a bridge 63 fixed in any suitable manner to armature shaft 6 by suitable means, the outer periphery of said bridge having longitudinal channels (not shown) formed therein, and receiving the ends of one of the low voltage windings, said ends being connected to the commutator segments of the commutator 9 in a manner well understood by those skilled in the art. The division of the load between these two low voltage windings has the further advantage that it makes it possible to employ a lighter construction and fewer armature turns, and this simplifies the problem of connecting the ends of the commutators.

There is thus provided a novel multi-wound generator capable of delivering energy at a plurality of voltages and one which is particularly adapted to be used on aircraft to supply energy to a radio transmitting set.

It is to be understood that constructions other than those illustrated and described may be employed without departing from the spirit of the invention, so long as the variations are within the scope of the appended claims. Reference will therefore be had to these claims for a definition of the limits of the invention.

What is claimed is:

1. In combination with an internal combustion engine, and a member driven thereby, a generator having an armature shaft with a plurality of windings thereon, a battery adapted to energize at least two of said windings, and a one-way driving connection of limited torque transmitting capacity between said engine member and said shaft whereby the generator may be operated from either said battery or said engine.

2. In combination with an internal combustion engine, a member driven thereby, a generator having an armature shaft and a plurality of windings thereon, and a battery in circuit therewith, said battery being adapted to energize said windings in parallel to operate the generator as a motor generator when the engine is not in operation, and being adapted to be charged by said windings in series when the engine is in operation.

3. In combination with an internal combustion engine and a generator having an armature shaft and a plurality of windings thereon, means for drivably connecting said armature shaft with said engine, a battery in circuit with said windings, and circuit switching means for charging said battery from said windings during the period of engine operation with a current of one voltage, and for delivering to both said windings a divided current of approximately equal voltages when said engine is at rest.

4. In combination with an internal combustion engine and a generator having an armature shaft and a plurality of windings thereon, means for drivably connecting said armature shaft with said engine, a battery in circuit with said windings, and circuit switching means for charging said battery from said windings during the period of engine operation, and for delivering a divided current to said windings when said engine is at rest.

5. In combination with a mechanical driving member, a generator having an armature shaft and a plurality of output windings, means for drivably connecting said armature shaft with said member, output circuits connected to said windings, a source of current supply adapted to feed said circuits in multiple to operate the generator as a motor-generator on de-energization of said driving member, and means for compounding the voltage outputs of said windings to charge said battery during operation as a mechanically driven generator.

6. In combination with a mechanical driving member, a generator having an armature shaft and a plurality of output windings, means for drivably connecting said armature shaft with said member, output circuits connected to said windings, a source of current supply operatively connected to at least two circuits, said current supply source being adapted to operate the generator as a motor generator, and means for compounding the voltage outputs of said windings to increase the capacity of said battery, and thereby lengthen the period of potential operation of the machine as a self-sustaining dynamotor.

JOSEPH W. ALLEN.